Figure 1:
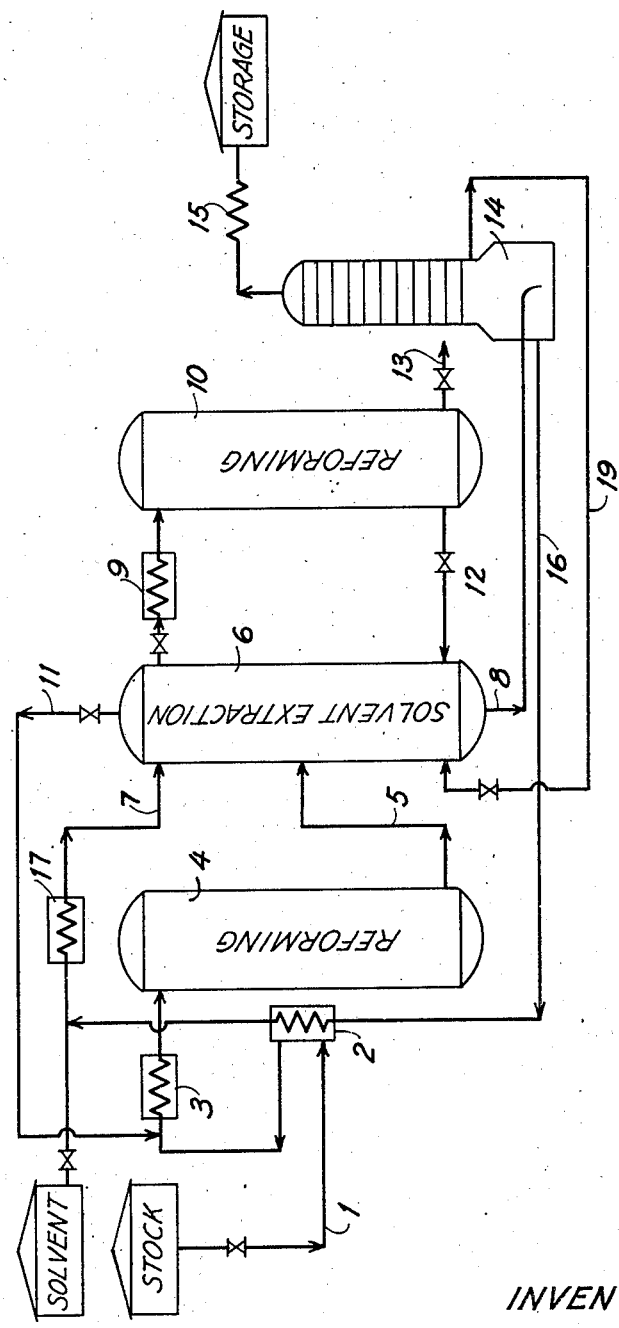
Figure 2:
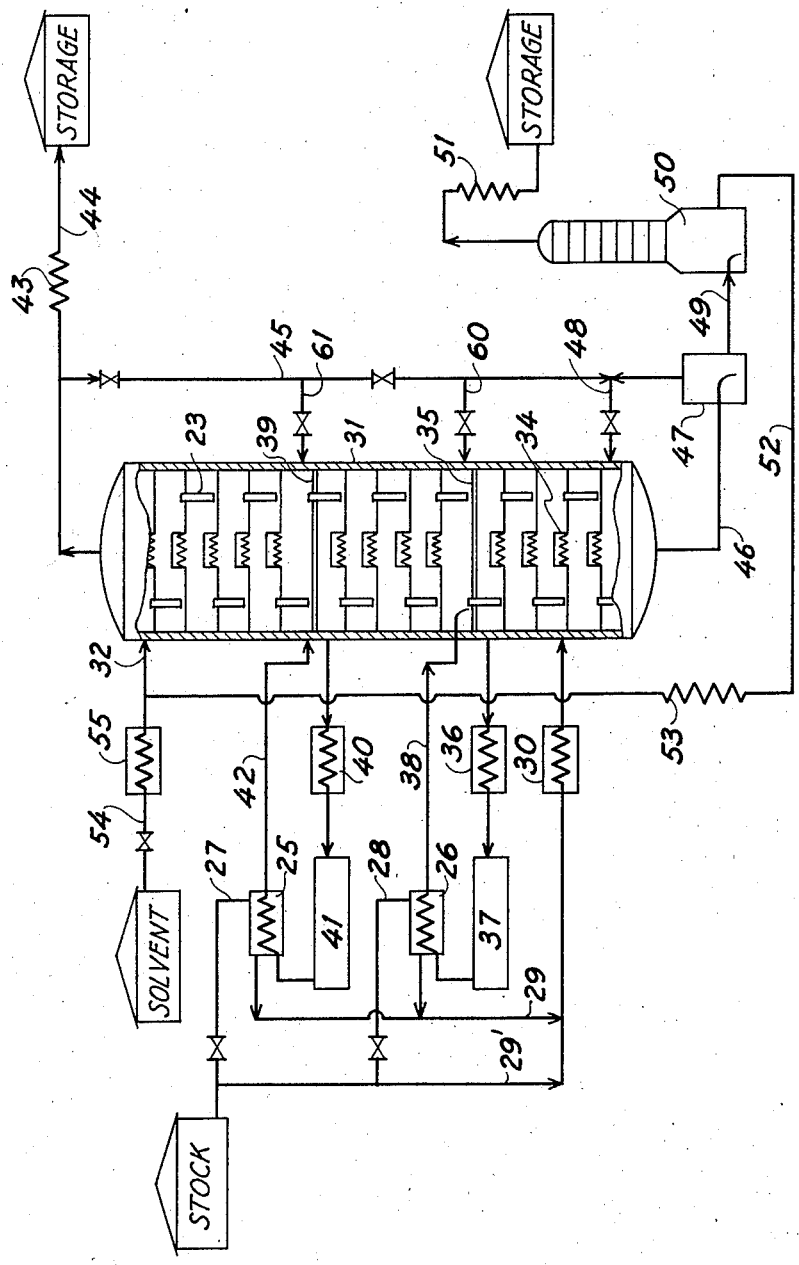

May 13, 1941.                A. L. SNOW                    2,241,430
            PROCESS OF TREATING HYDROCARBONS
                  Filed Feb. 7, 1938            2 Sheets-Sheet 1

INVENTOR
Alvah L. Snow
BY: *[signature]*
ATTORNEY

Patented May 13, 1941

2,241,430

UNITED STATES PATENT OFFICE 2,241,430

PROCESS OF TREATING HYDROCARBONS

Alvah L. Snow, San Francisco, Calif., assignor to Standard Oil Company of California, San Francisco, Calif., a corporation of Delaware Application February 7, 1938, Serial No. 189,160

10 Claims. (Cl. 196—13)

This invention relates to a new and improved process for treating hydrocarbons, and more particularly to a process of reforming petroleum distillates. The invention especially concerns improvements in processes for treating petroleum distillates to improve the octane number thereof by cyclization, isomerization, dehydrogenation and the like reactions.

An object of the invention is to provide a new and improved process of treating hydrocarbons.

Another object of the invention is to provide a process of reforming hydrocarbons in which reaction products are quenched in a liquid phase selective solvent and undesirable side reactions are thereby stopped.

A further object is to selectively dissolve reaction products from a reformed reaction mixture as the products are synthesized in the reforming operation whereby desired reactions are carried further than would otherwise be feasible.

An additional object of the invention is to minimize gumming and poisoning of the catalyst in catalytic reforming operations and to thereby avoid changes in the type of reactions catalyzed or total destruction of catalytic activity.

Another object is to provide a combination process in which hydrocarbons are reformed and extracted in a series of alternate steps, the vapors from each reforming step supplying the heat necessary in a vapor phase selective solvent extraction process and the quenching of vapors in the selective solvent, together with the selective removal of reaction products, serving to halt undesirable side reactions such as polymerization, which in turn decreases catalyst poisoning.

A further object is to provide a catalytic process in which catalyst poisons are removed as they are forming in order to minimize decrease in catalytic activity.

Figure I is a diagrammatic flow sheet illustrating a process utilizing two reforming stages and one selective solvent extraction stage. Figure II illustrates a multi-stage process in which vapors are removed from and introduced at various points along a combination fractionating and selective solvent extraction column.

In Figure I of the drawings, stock passes from storage through valve controlled line 1, heat exchanger 2 and heater 3, where the stock is heated to the desired temperature, to reforming chamber 4. The reactions, conditions of operation, and catalysts utilized in the reforming chamber will be subsequently described in detail. From the bottom of chamber 4 the treated hydrocarbons in vapor phase flow by way of conduit 5 to solvent extraction tower 6. A high boiling selective solvent is continuously admitted to the top of the tower through inlet 7 and flows downwardly through the tower to outlet 8.

To insure intimate contact of the hydrocarbon vapors and the liquid phase selective solvent in extraction column 6, various means may be adopted. A tower filled with suitable packing material, such as earthenware, glass, etc., comprises one effective form of apparatus for this purpose. A tower constructed in the same manner as an ordinary fractionating column (see Figure II) is also an effective means for insuring efficient extraction of the hydrocarbons with the selective solvent.

Undissolved vapor phase hydrocarbons are removed from the top of extraction tower 6 through heater 9 to reforming chamber 10. Although it is generally more desirable to operate a separate reformer as shown at 10, in order that conditions of operation can be controlled independently of the first reforming stage, valve controlled return line 11 has also been provided for recirculating vapors to the first reformer 4 by way of heater 3. Reformed vapors from chamber 10 are preferably passed through valve controlled conduit 12 to the solvent extraction tower 6, but may flow through line 13 and suitable condensers (not shown) to storage. Reforming chamber 10 may be operated at higher temperatures than reforming chamber 4, in which case the temperature in solvent extraction tower 6 will be highest at the bottom and a temperature gradient may be maintained in the solvent extraction tower.

The components of distillates having higher octane numbers, such as aromatic or unsaturated hydrocarbons, are selectively dissolved by the solvent in tower 6 and the lower octane compounds will therefore be removed from the extraction column as a vapor phase raffinate. The high octane compounds from the reforming stages are dissolved from the reaction mixture and removed from the bottom of column 6 as a liquid phase extract. The solvent and hydrocarbons are separated in still 14, the hydrocarbons passing as overhead through condenser 15 to storage. The selective solvent from still 14 is returned by way of conduit 16 through heat exchanger 2 and cooler 17 to the top of the extraction column. A valve controlled return line 19 is also provided for supplying hot vapors from the still to the bottom of extraction column 6 to facilitate control of temperature in the column.

Figure II illustrates a preferred arrangement for carrying out the process of this invention. In this figure stock to be treated is fed through heat exchangers 25 and 26 by independent valve controlled supply lines 27 and 28, respectively. The quantity of stock fed through the heat exchangers can be independently controlled and the temperature of the vapors supplied to the column from the exchangers maintained at predetermined values. From the heat exchangers the stock flows through conduit 29 to heater 30 where it is converted to vapor phase before passing to the extraction-fractionation tower, as shown. A by-pass 29' is also provided for supplying stock to the heater 30.

Selective solvent flows down the tower from inlet 32 by way of overflow pipes 33 provided for each bubble plate in the column. The hydrocarbon vapors from heater 30 pass upwardly through the column under bubble caps 34 and are extracted by the downwardly flowing selective solvent. As will be noted in Figure II, no bubble cap is provided in plate 35 and the vapor phase hydrocarbons from the lower section of the fractionating column therefore pass through heater 36 to catalytic reformer 37. The reformed hydrocarbons then flow through heat exchanger 26 and conduit 38 into the liquid phase selective solvent on plate 35. The vapors again pass upwardly through the column and are extracted by the selective solvent. It should be noted that the mixture is simultaneously fractionated by reason of heat of super-heat and heat of vaporization supplied to the column by the vapors from the catalytic reforming stage.

Plate 39 like plate 35 is not provided with a bubble cap and vapor phase hydrocarbons from the center section of the extraction column therefore flow through heater 40 to catalytic reforming chamber 41. The reformed vapors then pass through heat exchanger 25 and line 42 to the upper section of the extraction-fractionation tower. Vapor phase hydrocarbons from the top of the extraction column flow either through condenser 43 and line 44 to storage or the vapors may be recirculated to the column by way of valve controlled pipe 45.

The selective solvent, together with its dissolved compounds, is removed from the bottom of the column through line 46 to vaporizer 47 where a portion of the dissolved compounds are vaporized from the solvent and recirculated to the bottom of the extraction column through line 48, and when desired to points intermediate the ends of the column through valve controlled lines 60 and 61. These vapors serve to supply heat to and control the temperature of the extraction column. From vaporizer 47 the solvent and dissolved compounds flow through line 49 to still 50. The extracted hydrocarbons pass in vapor phase from the top of the still to condenser 51 and storage. The selective solvent stripped of its dissolved compounds is recirculated by way of line 52 and cooler 53 to inlet 32 of the solvent extraction tower. Fresh solvent may be supplied from storage through valve controlled line 54 and heater 55.

As has been previously stated, the catalytic treatment utilized may involve known reforming processes for producing cyclization, isomerization, dehydrogenation and the like reactions. The invention is not concerned with the reforming stage of the process alone, but relates to the combination of the reforming stage with the vapor phase solvent extraction stage. The following are examples of suitable catalysts and treatments for effecting desired reactions in the reforming stage.

Oxides of the metals of the sixth sub-group of the Periodic Table catalyze the cyclization of paraffins and may be utilized to increase the octane number of gasolines and similar hydrocarbon mixtures. For example, the catalytic effects of chromium oxide on the higher paraffins at 450° to 470° C. convert paraffins of six or more carbon atoms to aromatics of the same number of carbon atoms. The reaction is believed to take place through cyclization of the paraffin and subsequent dehydrogenation of the resulting naphthene since cyclic olefins in small amounts have been recovered in the reaction products. On the lower paraffins, chromium oxide acts as a dehydrogenation catalyst.

Molybdic sulfide has been found to be an effective catalyst for converting normal octane to ortho-xylene at 460° C.

Dehydrogenation with or without cyclization or isomerization also improves the octane number of gasolines and may be effected by metal oxides selected from the first, second, fourth and sixth sub-groups of the Periodic Table as well as from the alkaline earth group and the eighth group. The following are examples of such dehydrogenation catalysts: silver oxide, magnesium oxide on pumice, calcium oxide on pumice, zinc oxide on pumice, chromic oxide, mixtures of zinc oxide and chromic oxide, molybdic oxide, uranium oxide on pumice, mixtures of nickel oxide, zinc oxide and chromic oxide.

Isomerization of normal heptane has been obtained by heating it at 400° C. under a pressure of 60 atmospheres of nitrogen with 10% of a catalyst consisting of equal amounts of cupric oxide and molybdenum trisulfide.

In order to guide those skilled in the art in the manner and mode of utilizing this invention, the following additional description of details of temperature, catalysts and conditions of operation is included. Catalysts found to be active for converting hydrocarbons of lower octane number to hydrocarbons of higher octane number under these specific conditions are bauxite, precipitated alumina, zinc oxide, stanic oxide, zirconium oxide and thorium oxide.

The temperature of the above last-mentioned catalysts should be maintained for the most part within the range of 850° F. to 950° F. and preferably at approximately 900° F. At the beginning of operations with a fresh catalyst it is possible to use temperatures as low as 825° F. During the final portion of an operation with a catalyst which has become sluggish, the temperature can be raised to an upper maximum of 1025° F. without producing substantial cracking. By controlling temperature in this manner and by coordinating temperature with catalyst activity (i. e., increasing temperature as catalyst activity decreases) so that the ratio of volume of fixed gases formed to amount of hydrocarbons treated is maintained approximately constant, a treated gasoline having the same octane number at the beginning and end of an operating cycle is obtained. At temperatures below 825° F. the catalysts are not sufficiently active to increase the octane number of the vapors to a substantial extent.

It has also been found that introduction of steam along with the hydrocarbon vapors very greatly increases the active life of the catalysts without interfering with the formation of hydrocarbons having high octane number. This steam also does not interfere with the solvent extraction stage but may serve merely to decrease the miscibility of the selective solvent utilized with the hydrocarbon vapors being extracted.

The following specific example is given to illustrate the effects of treating at temperatures from 825° F. to 1025° F. with a bauxite catalyst in the reforming stage.

A California straight run gasoline distillate was vaporized and the vapors passed at atmospheric pressure through a body of bauxite held at 918°

F. The hydrocarbons were fed through the catalyst at a rate of one gallon of liquid fuel charged per 1.4 cu. ft. of catalyst space per hour. The following tabulation shows the chemical changes and the improvement in octane number resulting from this treatment.

|  | Untreated charge | Treated product |
|---|---|---|
| Octane number | 63 | 75 |
| Sulfur percent | 0.57 | 0.1 |
| Olefins do | 2.5 | 14.0 |
| Aromatics do | 8.2 | 11.9 |
| Naphthenes do | 33.1 | 32.8 |
| Paraffins do | 56.3 | 41.3 |

Example of methods of preparing catalysts suitable for use in the above specific process are: aluminum hydroxide may be precipitated from aluminum chloride solution with ammonia, washed, dried and ground to 30 to 60 mesh to give synthetic alumina; commercial zinc oxide power produced by calcining or burning may be wet with a 5% solution of agar-agar, dried and ground to 30 to 60 mesh; basic zinc carbonate may be precipitated from zinc sulfate solution with sodium carbonate, filtered, washed and dried. This precipitate may then be moistened with enough potassium carbonate solution to give 1% potassium oxide based on the amount of zinc oxide, dried and ground to 30 to 60 mesh. This product is termed "alkalized zinc oxide." Sponge tin may be heated with excess concentrated nitric acid to form insoluble stannic oxide and the mixture dried and screened to 30 to 60 mesh. Zirconium oxide may be prepared by sintering a commercial zirconium oxide powder with agar-agar and grinding to 30 to 60 mesh. Thorium carbonate may be precipitated from thorium nitrate solution with sodium carbonate, filtered, washed, dried and heated to transform it to the oxide, and ground to 30 to 60 mesh. These methods of catalyst preparations are merely to be regarded as illustrative of the many suitable methods which may be adopted.

The second stage of the process utilizes a simultaneous selective solvent extraction and fractionating zone to selectively remove the higher octane hydrocarbons from the reaction mixture as it flows out of the reforming zone. This second stage of the process may be briefly described as involving countercurrent contacting of hydrocarbons, preferably the normally liquid ones, such as ordinary gasoline, with a higher boiling selective solvent maintained in liquid phase and at a temperature above the boiling point of the hydrocarbons being treated.

In order to better understand this second stage of the process the action on one of the bubble plates in tower 31 may be considered in some detail. Reformed vapors enter the tower through line 38, for example, and are quenched in the liquid phase selective solvent flowing across plate 35. Since the preferred form of this invention utilizes reforming operations which are carried out under conditions of pressure and temperature such that the hydrocarbons are in vapor phase, the hydrocarbon mixture entering line 38 will also be in vapor phase, but at a somewhat lower temperature as controlled by heat interchanger 26. The temperature in tower 31 is maintained above the boiling point of the hydrocarbon mixture under the conditions of extraction in this tower. This desired temperature is maintained by controlling the temperature of the selective solvent entering the top of the tower, by controlling the temperatures of the reforming vapors admitted to the tower, and by controlling the amount of vaporization in heater 47. It is apparent that the temperature should also be maintained below the point at which the dissolved higher octane compounds would be vaporized from the selective solvent. In general, it has been found that this upper limit of temperature is in the order of 20° to 60° F. above the dew point of the stock under the conditions of extraction.

By maintaining a proper temperature in tower 31, the hydrocarbon vapors are simultaneously selectively extracted as they pass through the selective solvent on plate 35, for example, and are fractionated as they are vaporized from this plate and passed upward through the bubble cap of the next higher succeeding bubble plate. The vapor phase hydrocarbons from the reforming stage are sufficiently hot to serve as a source of heat for the fractionation in the extraction column. At the same time the vapors are giving up their heat to produce fractionation of vapors which have been previously condensed, these hotter vapors are being quenched by direct contact with the cooler selective solvent. As previously disclosed, the selective solvent preferentially dissolves high octane hydrocarbons, such as aromatics and/or unsaturates. Inasmuch as the volume of selective solvent is usually two or more times that of the hydrocarbons being extracted (measured as liquid phase) the dissolution of unsaturated compounds, for example, serves to dilute the mixture, and by reason of this dilution, may decrease the reaction rate of various undesirable side reactions. Furthermore, the sudden cooling of the hydrocarbons also tends to prevent or decrease undesired side reactions, particularly polymerization, and consequently reduces the extent of gum formation and the extent of catalyst poisoning by preventing the initial formation of such poisons. Also, the gums themselves may be dissolved by the selective solvent, inasmuch as these gums are often unsaturated in character. Thus the quenching of the hydrocarbons in the selective solvent serves the triple purpose of supplying heat, diluting the concentration of various ingredients, and lowering the temperature whereby undesirable side reactions are inhibited and catalyst poisons are either not formed at all or are removed in the extract phase.

Another feature of the combination process of this invention is that the reforming operation is carried out in a series of stages whereby the ultimate end point of the reaction is approached by a series of steps and the reaction product of each step removed before the next reaction stage is initiated. By adopting this procedure, it is possible to carry the reaction considerably further than would otherwise be feasible since removal of the reaction products in effect shifts the equilibrium point of the reforming reactions in the direction desired. In many cases it would be entirely impossible to reach the same ultimate end point with the removal of the reaction products as is done in the extraction stage herein described. In other cases, it might be possible to reach this same end point by raising the temperature of reaction but such elevated temperatures initiate additional side reactions which cause complications and which, as a rule, shorten the life of the catalyst.

To illustrate the characteristics of the solvent extraction stage of the process, the following data are given: a natural petroleum cut having a boiling range of 200° to 300° F. was extracted in a single fractionating tower provided with bubble caps. The data from a typical run using crude xylenols which had been topped at 450° F. as the selective solvent are given below:

| | |
|---|---|
| Rate of petroleum feed | 5 cc. a minute |
| Rate of solvent feed | 25 cc. a minute |
| Temperature at base of extraction column | 288° F. |
| Temperature of raffinate vapor | 216° F. |
| Temperature of still | 490° F. |
| Temperature of extract vapor from stripping column | 249° F. |
| Temperature of solvent entering extraction column | 254° F. |
| Temperature of stock entering column | 245° F. |
| Reflux ratio of raffinate | 1.9 |
| Extract yield | 38% |
| Aniline point of stock feed | 44.4° F. |
| Aniline point of raffinate | 85° F. |
| Aniline point of extract | —15° F. |

In this run the temperatures of feed and selective solvent were 5° to 10°, and 10° to 20° respectively, above the dew point of the stock.

A selective solvent useful for the present process should be highly selective and should have a boiling point well above the end point of the stock to be treated. A boiling point above approximately 300° F. will generally be found desirable in extraction of normally liquid low-boiling hydrocarbons. Preferably, the solvents should not form constant boiling mixtures with hydrocarbons but if such constant boiling point mixtures are formed the solubility characteristics of the solvent should be such that complete recovery by water extraction is possible. Various solvents with the above-desired properties have been found and are listed in the following table:

| Solvent | B. P. | Selectivity | Solubility* |
|---|---|---|---|
| | °F. | | |
| Resorcinol | 529 | 60.2 | 35 |
| Diacetin | 349 at 40 mm | 60.6 | 40 |
| Tetraethylene glycol | 293 at 0.1 mm | 56.0 | 30 |
| Phenol | 360 | 55.1 | 80 |
| Triethylene glycol | 550 | 55 | 26 |
| Tetramine | 511 | 54.3 | 48 |
| Anisidine | 435–484 | 51.3 | 80 |
| Diethylene glycol | 472 | 51.1 | 20 |
| "Carbitol" | 396 | 50.0 | 53 |
| Acetamide | 432 | 49.8 | 22 |
| Triacetin | 498 | 47.7 | 90 |
| Xylidine | 412–439 | 46.3 | 74 |
| Acetanilide | 579 | 45.8 | 80 |
| Diethanolamine | 514 | 43.9 | 15 |
| Nitrobenzene | 412 | 42.8 | 170 |
| Aniline | 361 | 42.4 | 140 |
| "Chlorex" | 352 | 39.7 | 166 |
| Diaminopropenol | 246 at 4 mm | 39.7 | 15 |
| Tri-cresylphosphate | 507 at 20 mm | 38.9 | 95 |
| Benzaldehyde | 355 | 38.2 | 162 |
| Triethanolamine | 531 at 150 mm | 36.5 | 15 |
| Eugenol | 487 | 36.4 | 94 |
| Diphenyl amine | 576 | 34.6 | 185 |
| Acetophenone | 396 | 34.4 | 150 |
| Xylenol | 450 | 32.1 | 140 |
| "Carbitol" acetate | 424 | 32.1 | 168 |
| Butyl carbitol | 448 | 29.9 | 130 |
| Phenetidine | 444–489 | 29.5 | 205 |
| Dibutyl phthalate | 410 at 20 mm | 27.6 | 140 |

\* Number of cc. of 215–240° F. straight run petroleum cut dissolved by 150 cc. of solvent at 250° F. and one atmosphere total absolute pressure.

The relative selectivity of the solvents listed above was determined by the following simple comparative test: a California petroleum cut having a boiling point of from 215° to 240° F. was added to 150 cc. of solvent. The petroleum was added slowly with constant stirring so that the solvent could be maintained at 250° F. during the test. A portion of the dissolved petroleum was vaporized from the mixture at this temperature and the first 3 cc. portion of overhead was taken for an aniline point test. The elevation of this aniline point over that of the original stock is designated "selectivity."

Tetraethylene glycol and triethylene glycol have high selectivity factors, high boiling points and are very efficient selective solvents for vapor phase extraction processes such as utilized in the solvent extraction stage of this invention. Ethylene amines constitute an additional example of an efficient high-boiling selective solvent. This compound is one of a generic group which may be represented by the general formula $NH_2C_2H_4(C_2H_4NH)_xNH_2$. Corresponding ring compounds are of the type formula

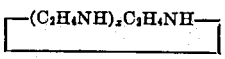

Although a number of specific examples of suitable selective solvents have been given, and although triethylene glycol and tetramine constitute preferred examples of solvents for the process of this invention, it should be apparent to those skilled in the art that the broader aspects of the invention include the use of a multitude of other selective solvents. High-boiling hydroxy ethers illustrated by diethylene glycol, triethylene glycol and tetraethylene glycol, comprise one chemical type of selective solvent most suitable for the process herein disclosed. High-boiling hydroxy esters comprise another chemical type of selective solvent.

Experiments indicate that polar compounds selected from the group consisting of aromatic hydroxy compounds, amines, amides, chlorinated hydrocarbons, esters of polycarboxylic acids, and phosphoric acid esters of hydroxy aromatics are in general operative in the process of the invention. As previously pointed out, the solvent selected from this group should have a boiling point sufficiently high so that it can be readily maintained in liquid phase under the conditions of extraction; in general, a boiling point above approximately 300° F. is desirable.

It should be understood that the process of this invention can be carried out under either sub-atmospheric or super-atmospheric pressure. In some instances it may be found desirable to operate the solvent extraction stage under vacuum, for example, and the reforming stage at higher pressures, such as atmospheric or above.

The process appears to find its greatest utility in the treatment of ordinary gasolines having a low octane number but may be utilized for treating relatively narrow cuts of petroleum fractions to produce highly concentrated solutions of desired synthetic compounds. For example, a narrow cut of highly naphthenic petroleum having a boiling point in the range of hexamethylene may be dehydrogenated by this process to obtain synthetic benzene.

In its broader aspect, this invention embraces the combination of thermal reforming processes and the selective solvent extraction process as herein disclosed. Anti-knock compounds formed by thermal reactions in the absence of a catalyst may be selectively separated or concentrated in a petroleum fraction by this combination treatment.

It should be recognized that the drawings are merely diagrammatic in character and that no attempt has been made to illustrate an apparatus embodying all the necessary details, such as valves, pumps and pressure control devices. The provision of suitable apparatus for carrying out the process is regarded as within the skill of the petroleum technician. Common forms of catalyst chambers, support for catalyst beds, heating and cooling means to control the temperature of the catalyst bed and the temperature of the petroleum vapors may be utilized.

While the character of this invention has been described in detail and numerous illustrative examples given, this has been done by way of illustration only, and with the intention that no limitation should be imposed upon the invention thereby. It will be apparent to those skilled in the art that numerous modifications and variations may be effected in the practice of the invention which is of the scope of the claims appended hereto.

I claim:

1. A process which comprises subjecting a petroleum fraction to a plurality of reforming operations whereby the ultimate end point of the reforming reaction is approached in a plurality of steps, inhibiting side reactions and selectively dissolving reformed reaction products by contacting the hydrocarbons from at least one of said reforming operations in vapor phase with a liquid phase solvent having a selective solvent action for aromatic and unsaturated hydrocarbons, at least partially condensing hydrocarbons in the solvent extraction zone, fractionating the mixture of selective solvent and dissolved hydrocarbons by intimately mixing said mixture with additional vapor phase hydrocarbons from a reforming operation, separating a vapor phase raffinate from said selective solvent and subjecting said vapor phase raffinate to at least one of said reforming reactions.

2. A process which comprises subjecting a petroleum fraction to a plurality of reforming operations whereby the ultimate end point of the reforming reaction is approached in a plurality of steps, inhibiting side reactions and selectively dissolving reformed reaction products by contacting the hydrocarbons from at least one of said reforming operations in vapor phase with a liquid phase poly-ethylene glycol, fractionating the mixture of polyethylene glycol and dissolved hydrocarbons by intimately mixing said mixture with additional vapor phase hydrocarbons from a reforming operation, separating a vapor phase raffinate from said poly-ethylene glycol and subjecting said vapor phase raffinate to at least one of said reforming reactions.

3. A process which comprises subjecting a petroleum fraction to a plurality of reforming operations whereby the ultimate end point of the reforming reaction is approached in a plurality of steps, inhibiting side reactions and selectively dissolving reformed reaction products by contacting the hydrocarbons from at least one of said reforming operations in vapor phase with a liquid phase poly-ethylene amine, fractionating the mixture of poly-ethylene amine and dissolved hydrocarbons by intimately mixing said mixture with additional vapor phase hydrocarbons from a reforming operation, separating a vapor phase raffinate from said poly-ethylene amine and subjecting said vapor phase raffinate to at least one of said reforming reactions.

4. A process which comprises subjecting a petroleum fraction to a plurality of reforming operations whereby the ultimate end point of the reforming reaction is approached in a plurality of steps, inhibiting side reactions and selectively dissolving reformed reaction products by contacting the hydrocarbons from at least one of said reforming operations in vapor phase with a liquid phase phenol, fractionating the mixture of phenol and dissolved hydrocarbons by intimately mixing said mixture with additional vapor phase hydrocarbons from a reforming operation, separating a vapor phase raffinate from said phenol and subjecting said vapor phase raffinate to at least one of said reforming reactions.

5. A process of treating hydrocarbons which comprises subjecting said hydrocarbons to a plurality of reforming treatments, at least one of said treatments being effected at a temperature higher than that utilized in other of said treatments, passing hydrocarbon vapors while hot from a lower temperature reforming zone into one point of a fractionating zone, passing hydrocarbon vapors from the higher temperature reforming zone into said fractionating zone at a point different from said first point, flowing a solvent having a selective solvent action for aromatic and unsaturated hydrocarbons through said fractionating zone from said first to said second point, whereby a temperature differential is maintained between said two points and dissolved hydrocarbons tend to vaporize from said selective solvent and flow countercurrently thereto.

6. A process of reforming a petroleum distillate to increase the antiknock value thereof which comprises subjecting said petroleum distillate to a reforming treatment at elevated temperature, quenching the resulting reaction mixture to suddenly lower the temperature thereof to a temperature at which reaction therein substantially ceases and simultaneously dissolving aromatics and unsaturated constituents from the resulting reaction mixture by introducing said reaction mixture at a temperature at which reaction therein is still proceeding into a relatively cool body of liquid comprising a selective solvent for aromatic and unsaturated constituents, said relatively cool body of liquid being at a temperature above the initial boiling point of the resulting reaction mixture under the prevailing pressure so that a portion of said reaction mixture not dissolved by said selective solvent remains in the vapor phase and below the temperature at which the aromatics or unsaturates dissolved in said selective solvent would be vaporized therefrom, simultaneously to stop undesirable side reactions taking place in said reaction mixture and to remove therefrom aromatic and unsaturated reaction products.

7. A process as defined in claim 6 in which said petroleum distillate is reformed at an elevated temperature of from about 825° F. to about 1025° F. in contact with a reforming catalyst.

8. A process as defined in claim 6 in which said undissolved vaporous portion of said reaction mixture is further reformed.

9. A process of treating a petroleum distillate to increase the antiknock value thereof which comprises subjecting said petroleum distillate to a dehydrogenation treatment at an elevated temperature of from about 825° F. to about 1025° F. in contact with a dehydrogenation catalyst, quenching the resulting reaction mixture to suddenly lower the temperature thereof to a temperature at which reaction therein substantially ceases and simultaneously dissolving aromatics and unsaturated constituents from the resulting reaction mixture by introducing said reaction mixture at a temperature at which reaction therein is still proceeding into a relatively cool body of liquid comprising a selective solvent for aromatic and unsaturated constituents, said relatively cool body of liquid being at a temperature above the initial boiling point of the resulting reaction mixture under the prevailing pressure so that a portion of said reaction mixture not dissolved by said selective solvent remains in the vapor phase and below the temperature at which the aromatics or unsaturates dissolved in said selective solvent would be vaporized therefrom, simultaneously to stop undesirable side reactions taking place in said reaction mixture and to remove therefrom aromatic and unsaturated reaction products.

10. A process of treating a petroleum distillate to increase the antiknock value thereof which comprises subjecting said petroleum distillate to a cyclization treatment at an elevated temperature of from about 825° F. to about 1025° F. in contact with a cyclization catalyst, quenching the resulting reaction mixture to suddenly lower the temperature thereof to a temperature at which reaction therein substantially ceases and simultaneously dissolving aromatics and unsaturated constituents from the resulting reaction mixture by introducing said reaction mixture at a temperature at which reaction therein is still proceeding into a relatively cool body of liquid comprising a selective solvent for aromatic and unsaturated constituents, said relatively cool body of liquid being at a temperature above the initial boiling point of the resulting reaction mixture under the prevailing pressure so that a portion of said reaction mixture not dissolved by said selective solvent remains in the vapor phase and below the temperature at which the aromatics or unsaturates dissolved in said selective solvent would be vaporized therefrom, simultaneously to stop undesirable side reactions taking place in said reaction mixture and to remove therefrom aromatic and unsaturated reaction products.

ALVAH L. SNOW.